(12) United States Patent
Masuo et al.

(10) Patent No.: US 9,120,166 B2
(45) Date of Patent: Sep. 1, 2015

(54) CHAMFERING DEVICE AND GEAR PROCESSING MACHINE PROVIDED THEREWITH

(75) Inventors: Koichi Masuo, Tokyo (JP); Takahide Tokawa, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 450 days.

(21) Appl. No.: 13/504,552

(22) PCT Filed: Oct. 6, 2010

(86) PCT No.: PCT/JP2010/067504
§ 371 (c)(1),
(2), (4) Date: Jun. 18, 2012

(87) PCT Pub. No.: WO2011/114558
PCT Pub. Date: Sep. 22, 2011

(65) Prior Publication Data
US 2012/0251258 A1 Oct. 4, 2012

(30) Foreign Application Priority Data

Mar. 15, 2010 (JP) ................................ 2010-057009

(51) Int. Cl.
*B23F 19/10* (2006.01)

(52) U.S. Cl.
CPC .............. *B23F 19/10* (2013.01); *B23F 19/102* (2013.01); *Y10T 29/5176* (2015.01); *Y10T 409/101113* (2015.01); *Y10T 409/108586* (2015.01)

(58) Field of Classification Search
CPC ........... Y10T 409/101113; Y10T 409/108586; Y10T 29/5176; B23F 19/10; B23F 19/102; B23F 19/104; B23F 19/105; B23F 19/107
USPC .......................................... 409/8, 55; 29/56.5
See application file for complete search history.

(56) References Cited

U.S. PATENT DOCUMENTS

| 6,050,755 A | 4/2000 | Huber et al. |
| 6,757,949 B2 * | 7/2004 | Fitzgerald et al. ............. 29/56.5 |

FOREIGN PATENT DOCUMENTS

| JP | 60-74913 U | 5/1985 |
| JP | 62-78220 U | 5/1987 |
| JP | 8-99221 A | 4/1996 |

(Continued)

OTHER PUBLICATIONS

Machine translation of JP 2009-039800, which JP '800 was published Feb. 2009.*

*Primary Examiner* — Erica E Cadugan
(74) *Attorney, Agent, or Firm* — Birch, Stewart, Kolasch & Birch, LLP

(57) ABSTRACT

Position adjustments of a chamfering cutter and a deburring cutter in a chamfering device with respect to a workpiece can be easily carried out. The chamfering device has a chamfering cutter, a deburring cutter which has a diameter different from that of the chamfering cutter; a cutter swing block, a cutter longitudinal feed block, and a base block, which rotatably support the chamfering cutter and the deburring cutter and are capable of subjecting the chamfering cutter and the deburring cuter to position adjustment with respect to the workpiece. The longitudinal feed block can perform single-axis feeding with respect to the workpiece. The chamfering cutter and the deburring cutter are disposed so that the cutting change amount of the chamfering cutter and that of the deburring cutter will be approximately equal to each other throughout the diameter range of the workpiece to be processed.

8 Claims, 7 Drawing Sheets

(56) References Cited

FOREIGN PATENT DOCUMENTS

| | | |
|---|---|---|
| JP | 3056882 U | 3/1999 |
| JP | 2006-224228 A | 8/2006 |
| JP | 2009-39800 A | 2/2009 |
| WO | WO 2006/083767 A2 | 8/2006 |

* cited by examiner

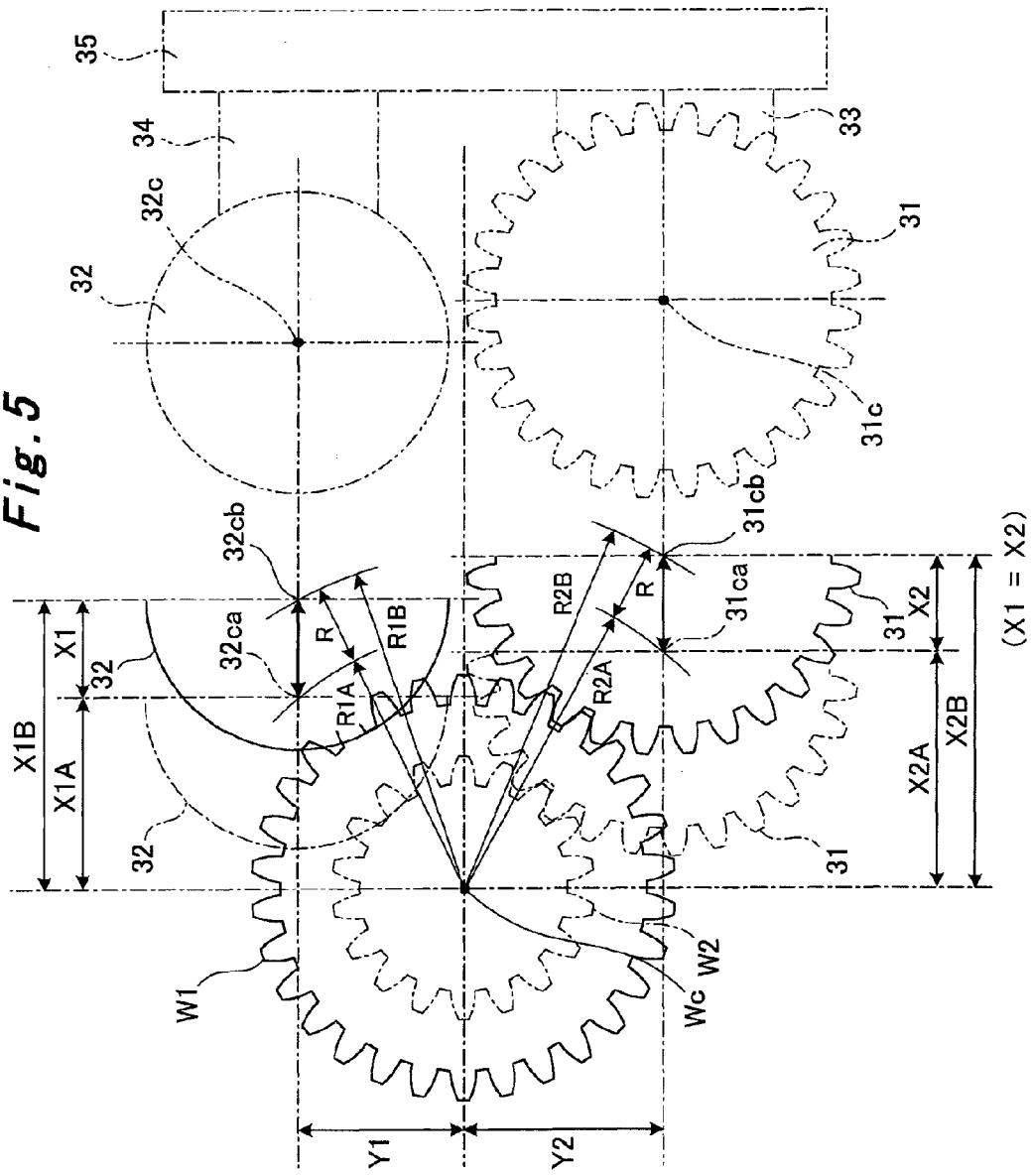

CHAMFERING DEVICE AND GEAR PROCESSING MACHINE PROVIDED THEREWITH

TECHNICAL FIELD

This invention relates to a chamfering device and a gear processing or cutting machine provided therewith.

BACKGROUND ART

After a gear is cut in a workpiece by a hobbing machine or the like, the tooth profile ridge of a gear end face is chamfered (gear chamfering), if necessary. This chamfering function is performed using a chamfering cutter and a deburring cutter (see, for example, Patent Document 1). That is, the chamfering cutter is pressed against a location of the workpiece where the gear is formed, to cause plastic deformation. Burrs, which occur at the edge of the workpiece by this plastic deformation, are cut and removed by the deburring cutter having a disk-shaped blade.

As the chamfering device having the above-mentioned chamfering function, there are a device having respective cutters (a chamfering cutter and a deburring cutter) provided on feed blocks (i.e., a device with a plurality of axial feed mechanisms), and a device having a chamfering cutter and a deburring cutter provided on a single feed block for compactness (i.e., a device with a single axial feed mechanism).

There have been the needs of the marketplace to provide the above-mentioned chamfering function in a space within the hobbing machine where no instruments are installed.

PRIOR ART DOCUMENTS

Patent Documents

Patent Document 1: Registered Utility Model No. 3056882

SUMMARY OF THE INVENTION

Problems to be Solved by the Invention

The above device having a plurality of axial feed mechanisms can adjust the position of each cutter with respect to a workpiece when the size of the workpiece changes. However, the axial feed mechanism has to be installed for each cutter, so that the structure of the device becomes complicated. Moreover, the space occupied by the axial feed mechanisms installed is wide.

The device with one axial feed mechanism mentioned above can itself be configured to be compact. When the size of the workpiece changes, however, it is necessary to adjust the positions of the chamfering cutter and the deburring cutter with respect to the workpiece. Even when the position of the chamfering cutter is adjusted with respect to the workpiece by the one axial feed mechanism, therefore, the deburring cutter is not located at an appropriate position with respect to the workpiece, because the diameter of the chamfering cutter and the diameter of the deburring cutter are different. This has required that the position of the deburring cutter be adjusted separately in addition to the adjustment by the axial feed mechanism. Even if the position of the deburring cutter is adjusted with respect to the workpiece by the one axial feed mechanism, on the other hand, the chamfering cutter is not located at an appropriate position with respect to the workpiece, because the diameter of the deburring cutter and the diameter of the chamfering cutter are different as above. This has required that the position of the chamfering cutter be adjusted separately in addition to the adjustment by the axial feed mechanism.

Thus, the present invention has been proposed in the light of the above-described problems. It is an object of the present invention to provide a chamfering device which, in a simple structure or configuration, can easily carry out the position adjustment of a chamfering cutter and a deburring cutter with respect to a workpiece; and a gear cutting machine provided with the chamfering device.

Means for Solving the Problems

A chamfering device according to the present invention, which solves the above problems, comprises:

a chamfering cutter for chamfering a workpiece having a gear cut therein;

a deburring cutter for removing burrs of the workpiece, the deburring cutter having a diameter different from a diameter of the chamfering cutter; and a feed block which rotatably supports the chamfering cutter and the deburring cutter and can adjust the positions of the chamfering cutter and the deburring cutter with respect to the workpiece, the chamfering cutter and the deburring cutter being disposed such that the feed block can be uniaxially fed with respect to the workpiece and that a cutting change amount of the chamfering cutter and a cutting change amount of the deburring cutter are nearly equal to each other throughout a diameter range of the workpiece to be processed.

A chamfering device according to the present invention, which solves the above problems, is the above-mentioned chamfering device, wherein the deburring cutter and the chamfering cutter are disposed with respect to the workpiece such that a distance R1B in a cutting direction between an axis of the workpiece and an axis of the deburring cutter, and a distance R2B in a cutting direction between the axis of the workpiece and an axis of the chamfering cutter, when the workpiece is of a maximum diameter of the workpiece to be processed, a distance R1A in the cutting direction between the axis of the workpiece and an axis of the deburring cutter, and a distance R2A in the cutting direction between the axis of the workpiece and an axis of the chamfering cutter, when the workpiece is of a minimum diameter of the workpiece to be processed, and a distance Y1 between the axis of the workpiece and the axes of the deburring cutter, and a distance Y2 between the axis of the workpiece and the axes of the chamfering cutter, in a direction orthogonal to a feeding direction of the feed block satisfy Equation (1) indicated below.

[Equation 1]

$$\sqrt{R1B^2 - Y1^2} - \sqrt{R1A^2 - Y1^2} = \sqrt{R2B^2 - Y2^2} - \sqrt{R2A^2 - Y2^2} \quad (1)$$

A chamfering device according to the present invention, which solves the above problems, is the above-mentioned chamfering device, wherein the feed block is composed of two feed blocks, and an axial feed mechanism capable of axially feeding one of the feed blocks toward the workpiece, and has a shaft disposed to be capable of supporting the one feed block on the other feed block.

A chamfering device according to the present invention, which solves the above problems, is the above-mentioned chamfering device, further comprising restraint means for restraining swing of the one feed block by the shaft.

A chamfering device according to the present invention, which solves the above problems, is the above-mentioned chamfering device, further comprising an elastic body disposed between the one feed block and the other feed block.

A chamfering device according to the present invention, which solves the above problems, is the above-mentioned chamfering device, wherein the elastic body is disposed to urge the one feed block toward the chamfering cutter.

A gear cutting machine according to the present invention, which solves the above problems, is equipped with the above-mentioned chamfering device.

Effects of the Invention

According to the chamfering device concerned with the present invention, the feed amount of the chamfering cutter and the feed amount of the deburring cutter with respect to the workpiece are rendered nearly equal over the diameter range of the workpiece to be processable by the chamfering cutter and the deburring cutter, from the maximum diameter to the minimum diameter. As a result, the chamfering cutter and the deburring cutter can be positioned by the single feed block. Thus, the position adjustment of the respective cutters with respect to the workpiece can be made easily by the simple structure. Moreover, the device can be downsized.

According to the chamfering device concerned with the present invention, the feed block is composed of the two feed blocks, and the axial feed mechanism capable of axially feeding one of the feed blocks toward the workpiece, and has the shaft disposed to be capable of supporting the one feed block on the other feed block. Thus, the position adjustment of the chamfering cutter and the deburring cutter with respect to the workpiece can be made easily by the simple structure.

The chamfering device according to the present invention further comprises the restraint means for restraining the swing of the one feed block by the shaft. Thus, the chamfering cutter and the deburring cutter can be arranged at such locations that the distance between the axis of the chamfering cutter and the workpiece and the distance between the axis of the deburring cutter and the workpiece equal each other. Thus, the position adjustment of the chamfering cutter and the deburring cutter with respect to the workpiece can be made easily by the simple structure.

The chamfering device according to the present invention further comprises the elastic body disposed between the one feed block and the other feed block. Thus, impact when the chamfering cutter or the deburring cutter contacts the workpiece upon the movement of the one feed block toward the workpiece can be reduced by the elastic body.

According to the chamfering device concerned with the present invention, the elastic body is disposed to urge the one feed block toward the chamfering cutter. When the one feed block is moved toward the workpiece, therefore, the chamfering cutter can be easily allowed to contact the workpiece earlier than the deburring cutter. Furthermore, even when the crests of the teeth of the workpiece and the chamfering cutter contact each other during engagement of the workpiece with the chamfering cutter, the chamfering cutter is pushed by the workpiece upon rotation of the workpiece. Thus, the crest position of the tooth of the chamfering cutter changes, whereupon the crest-root engagement of the teeth of the workpiece and the chamfering cutter can be achieved. Thus, the position adjustment of the chamfering cutter and the deburring cutter with respect to the workpiece is facilitated.

The gear cutting machine according to the present invention is equipped with the chamfering device. Thus, the gear-cut workpiece can be subjected to chamfering and deburring, if necessary, within the same device.

BRIEF DESCRIPTION OF THE DRAWINGS

FIGS. 1(a) and 1(b) are perspective views of a gear cutting machine according to a first embodiment of the present invention, in which FIG. 1(a) shows a state at the time of gear cutting in a workpiece and at the time of chamfering of the workpiece, and FIG. 1(b) shows a state before these processings.

FIG. 5 is a view for illustrating the positional relationship between a chamfering cutter/a deburring cutter, which the chamfering device has, and the workpiece.

FIGS. 7(a) to 7(e) are explanation drawings of the operating state of the chamfering device provided in the gear cutting machine according to the first embodiment of the present invention, in which FIG. 7(a) shows a state where the chamfering device is disposed at a start position, FIG. 7(b) shows a state where the chamfering device is disposed in proximity to the workpiece, FIG. 7(c) shows a state where the engagement of the chamfering cutter of the chamfering device with the workpiece is incomplete, FIG. 7(d) shows a state where the engagement of the chamfering cutter of the chamfering device with the workpiece has been completed, and FIG. 7(e) shows the state of workpiece processing by the chamfering device.

MODE FOR CARRYING OUT THE INVENTION

The mode for putting a chamfering device and a gear cutting machine provided therewith according to the present invention will be described concretely below based on embodiments.

Embodiment 1

The gear cutting machine according to the first embodiment of the present invention will be concretely described using FIGS. 1(a), 1(b) to FIGS. 7(a) to 7(e). In FIG. 4 to FIGS. 6(a), 6(b), the positions of a workpiece, a chamfering cutter, and a deburring cutter when the workpiece to be processed is in the maximum size (maximum diameter) are indicated by solid lines, while the positions of the workpiece, the chamfering cutter, and the deburring cutter when the workpiece to be processed is in the minimum size (minimum diameter) are indicated by dashed dotted lines. In FIG. 5, the state before processing of the workpiece is indicated by dashed double-dotted lines.

Figure 1B:
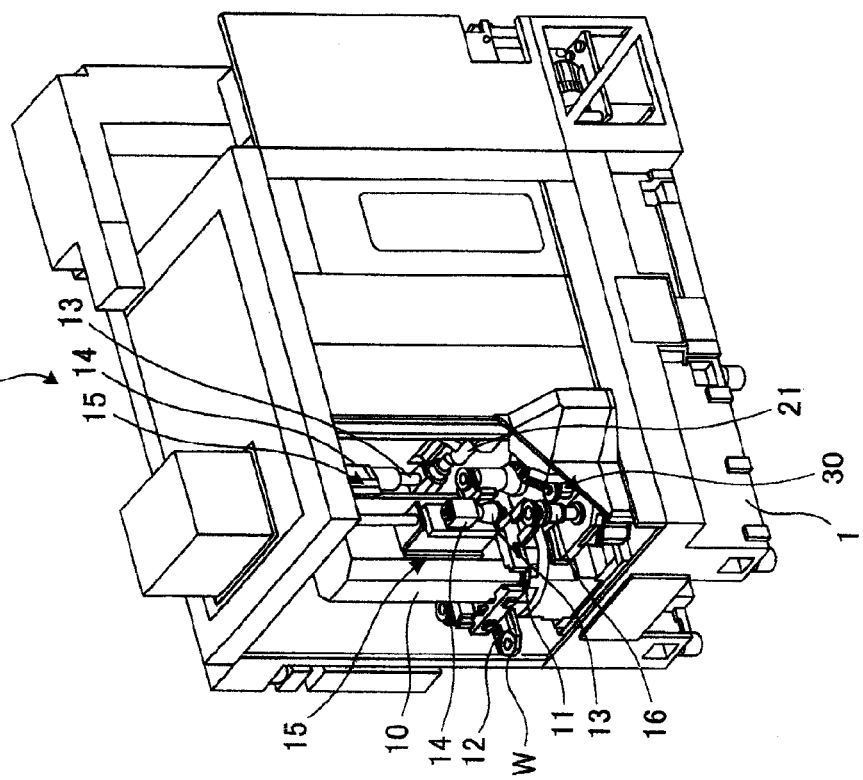
Figure 1A:
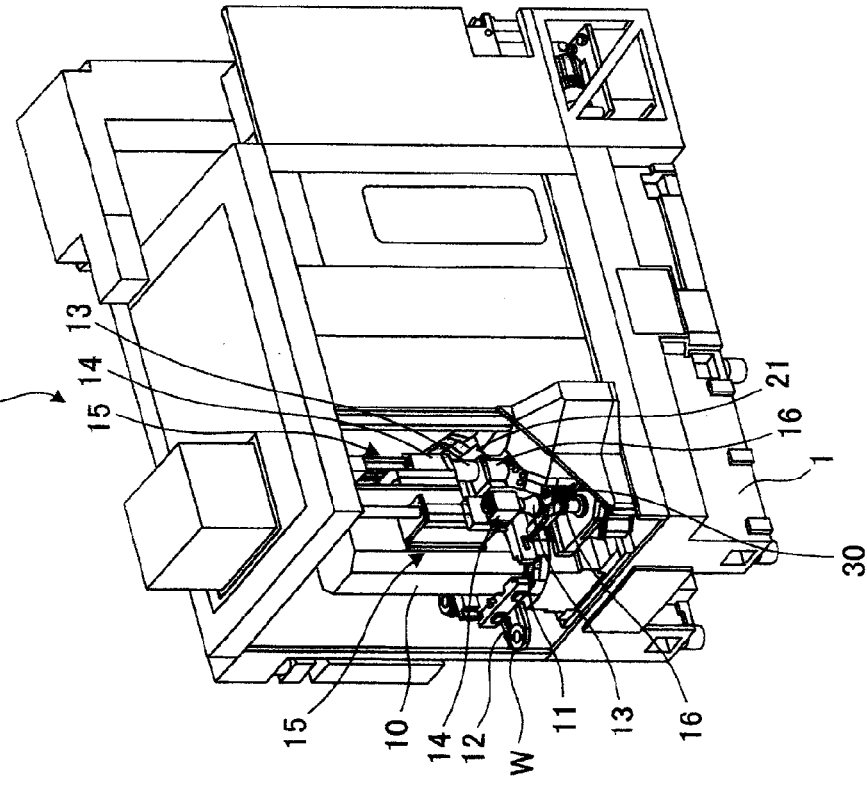
Figure 2:
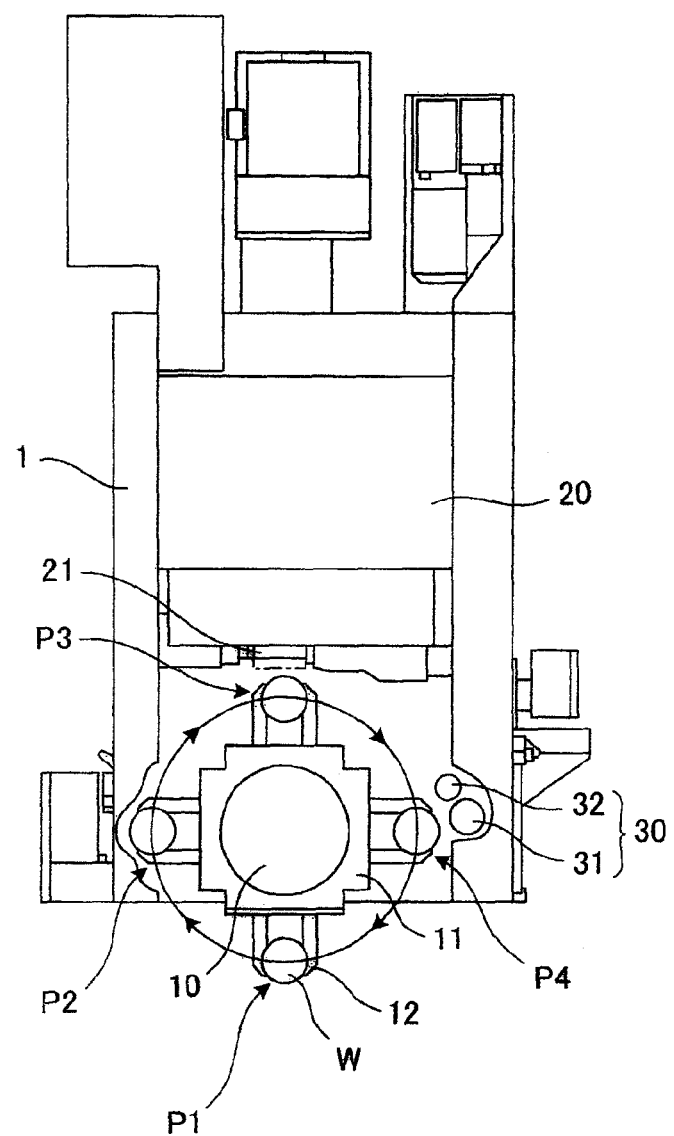
FIG. 2 is a plan view of the gear cutting machine according to the first embodiment of the present invention.

A gear cutting machine 100 according to the first embodiment of the present invention is a hobbing machine for cutting a gear in a workpiece by use of a hob, as shown in FIGS. 1(a), 1(b) and FIG. 2. This gear cutting machine 100 has a bed 1, a counter column 10 erected on the bed 1, a swing ring (4-station ring loader) 11 provided swingably on the outer periphery of a lower part of the counter column 10, and four grippers 12 provided on the swing ring 11 for gripping workpieces W.

These grippers 12 are disposed at a carry-in/carry-out position P1, a preparation position P2, a hobbing position P3, and a chamfering position P4, respectively. In accordance with the clockwise rotation of the swing ring 11 through each 90 degrees, the grippers 12 are sequentially moved to and disposed at the above-mentioned predetermined positions (the carry-in/carry-out position P1, the preparation position P2, the hobbing position P3, and the chamfering position P4). At the hobbing position P3 and the chamfering position P4, installation blocks 16 for bearing the workpiece W axially rotatably are disposed, respectively.

A column 20 is disposed to oppose the aforementioned counter column 10. On the column 20, a hob 21 is rotatably supported for cutting a gear in the workpiece W gripped by the gripper 12 and disposed at the hobbing position P3. In the vicinity of the hob 21, a chamfering device 30 is disposed for chamfering the gear-cut workpiece W. In the gear cutting machine 100, the hob 21 is disposed to be capable of gear cutting (see the workpiece W shown in FIG. 3).

The counter column 10 mentioned above is equipped with a work arbor 13 positioned above the workpiece W for rotatably supporting the workpiece W, a drive device 16 for rotationally driving the workpiece W, and a moving mechanism 15 for supporting the work arbor 13 via a work arbor support 14 so as to be vertically movable.

Figure 3:
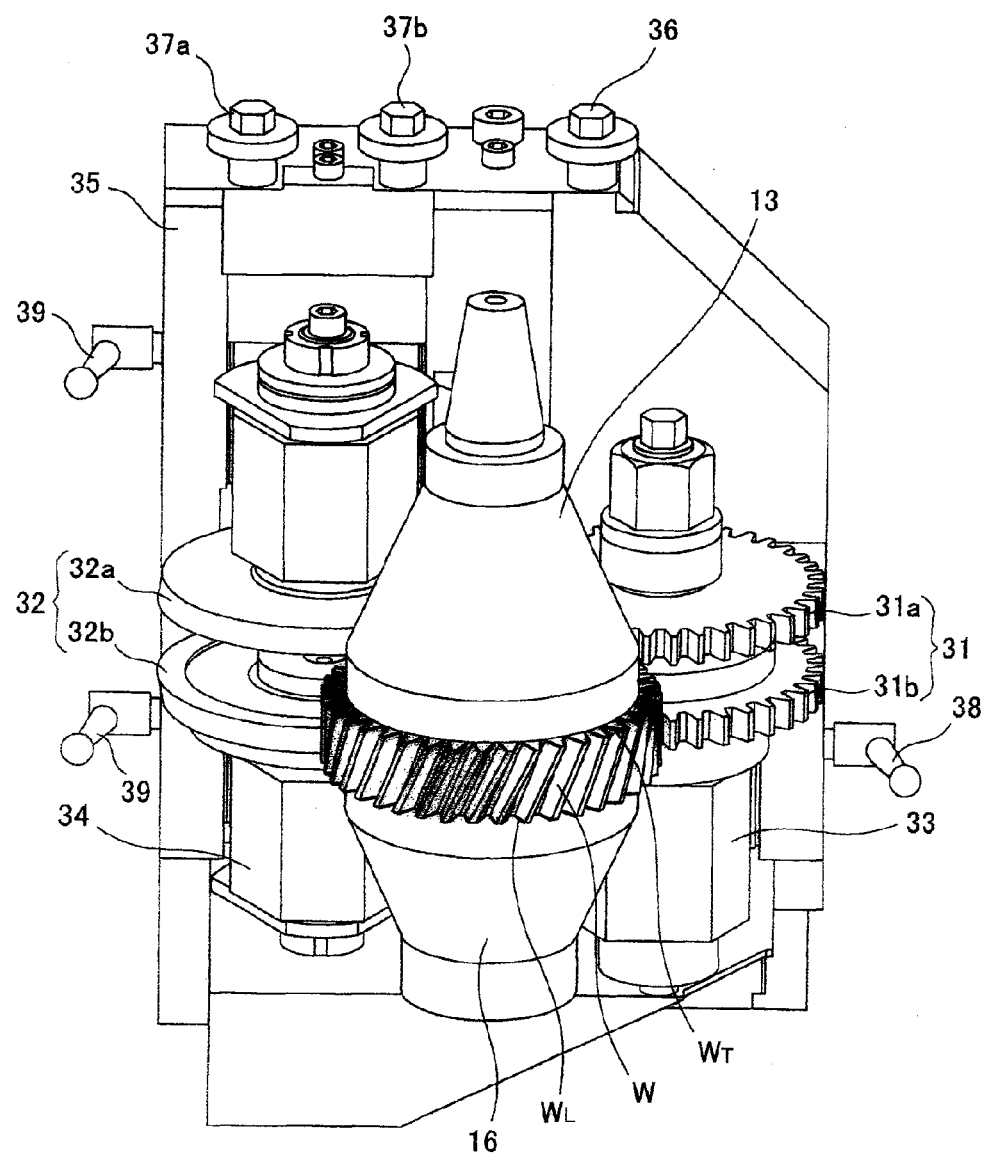
FIG. 3 is a perspective view of a chamfering device provided in the gear cutting machine according to the first embodiment of the present invention.
Figure 4:
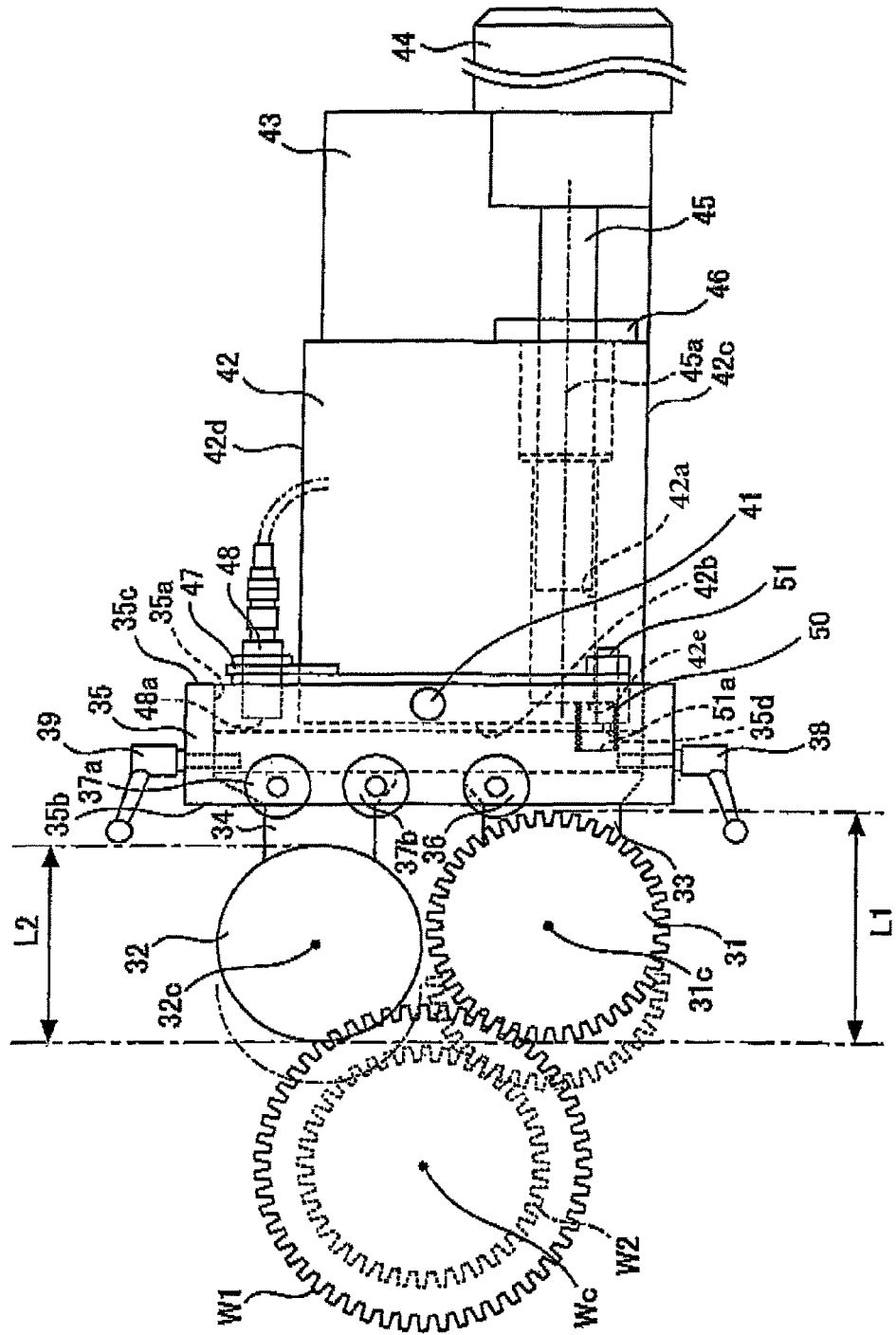
FIG. 4 is a schematic view of the chamfering device provided in the gear cutting machine according to the first embodiment of the present invention.

The above-mentioned chamfering device 30, as shown in FIGS. 3 and 4, is provided with a chamfering cutter 31, a deburring cutter 32, support blocks 33, 34, a cutter swing block 35, a cutter longitudinal feed block 42, and a cutter longitudinal feed motor 44.

The chamfering cutter 31 is disposed on the support block 33 which rotatably supports the chamfering cutter 31, while the deburring cutter 32 is disposed on the support block 34 which supports the deburring cutter 32 so as to be rotatable and vertically movable. The vertical movement of the deburring cutter 32 is performed by a piston (not shown) incorporated in the support block 34, and a pressing means (not shown). These support blocks 33, 34 are fixed to the side of the leading end 35b of the cutter swing block (one feed block) 35. Fixing handles 38, 39 for fixing the chamfering cutter 31 and the deburring cutter 32 to the cutter swing block 35 are attached, respectively, to side parts of the cutter swing block 35. Height adjusting screws 36, 37a, 37b for adjusting the height positions of the chamfering cutter 31 and the deburring cutter 32 are attached, respectively, to upper parts on the side of the leading end 35b of the cutter swing block 35. By means of these height adjusting screws 36, 37a, 37b, therefore, the positions in the height direction of chamfering cutter bodies 31a, 31b to be described later, and the positions in the height direction of deburring cutter bodies 32a, 32b to be described later can be adjusted in conformity with the height of the workpiece W.

A hole 35a is formed in the base end 35c of the cutter swing block 35. The cutter longitudinal feed block (the other feed block) 42 is disposed such that the front end 42b thereof is inserted into the hole 35a, and that a gap is present in the hole 35a between the end face at the rear end of the cutter swing block 35 and the front end 42b of the cutter longitudinal feed block 42. In such a state, a swing shaft 41 is disposed to penetrate the cutter swing block 35 and the cutter longitudinal feed block 42. Thus, the cutter swing block 35 is supported by the cutter longitudinal feed block 42 via the swing shaft 41, and is supported by the cutter longitudinal feed block 42 so as to be swingable about the swing shaft 41 as a swing center.

The cutter longitudinal feed block 42 is disposed on a base block 43. The cutter longitudinal feed motor 44 is fixed to one end side of the base block 43. The longitudinal feed motor 44 has a shaft body 45 extending toward the cutter swing block 35. However, the longitudinal feed motor 44 is disposed such that the chamfering cutter 31 is positioned in the extending direction of the shaft body 45. The shaft body 45 is disposed to pass through a hole 42a formed in the cutter longitudinal feed block 42. A member 46 of a cylindrical shape (hereinafter, referred to as the cylindrical member) having a threaded part formed in its inner surface is fixed in the hole 42a in the vicinity of the end face of the cutter longitudinal feed block 42 on the side of the cutter longitudinal feed motor 44. The threaded part of the cylindrical member 46 is engaged with a threaded part formed in the peripheral surface of the shaft body 45. Thus, the cutter longitudinal feed motor 44 is driven to rotate the shaft body 45 forwardly or reversely, whereby the cutter longitudinal feed block 42 slides on the base block 43. As a result, the position of the cutter swing block 35 is adjusted between the position where the workpiece W and the chamfering cutter 31 engage each other, and the position where the chamfering cutter 31 and the deburring cutter 32 are spaced from the workpiece W. The above-mentioned shaft body 45 and the cylindrical member 46 constitute an axial feed mechanism.

A swing force exerting spring 50, which is an elastic body, is disposed between the cutter swing block 35 and the cutter longitudinal feed block 42. Concretely, the swing force exerting spring 50 is disposed in a hole 35d formed in the cutter swing block 35 and a hole 42e formed in the cutter longitudinal feed block 42. By the action of the swing force exerting spring 50, the reaction force of the cutter longitudinal feed block 42 is obtained to urge the cutter swing block 35. Thus, the cutter swing block 35 swings about the swing shaft 41 as the swing center, whereby the chamfering cutter 31 fixed to the cutter swing block 35 is brought closer to the workpiece W than is the deburring cutter 32. As a result, when the cutter swing block 35 is moved toward the workpiece W, the chamfering cutter 31 can be easily allowed to contact the workpiece W earlier than the deburring cutter 32. Further, even when the crests of the teeth of the workpiece W and the chamfering cutter 31 contact each other during engagement of the workpiece W with the chamfering cutter 31, the chamfering cutter 31 is pushed by the workpiece W upon rotation of the workpiece W. Thus, the crest position of the tooth of the chamfering cutter 31 changes, whereupon the crest-root engagement of the teeth of the workpiece W and the chamfering cutter 31 can be achieved.

A swing stopper 51, which is a restraint means, is fixed to a site, beside the workpiece W, of a side part 42c of the cutter longitudinal feed block 42. When the cutter swing block 35 is axially fed toward the vicinity of the workpiece W, with the chamfering cutter 31 being in engagement with the workpiece W, the leading end 51a of the swing stopper 51 contacts the hole 35a of the cutter swing block 35, whereby the swing of the cutter swing block 35 (i.e., counterclockwise movement in FIG. 4) is restrained. Even after engagement between the workpiece W and the chamfering cutter 31, therefore, the deburring cutter 32 can be positioned relative to the workpiece W.

An engagement confirming detector 48 for detecting the state of engagement between the workpiece W and the chamfering cutter 31 is disposed via a fixture 47 on a side part 42d of the cutter longitudinal feed block 42.

The above-mentioned chamfering cutter 31 is composed of a pair of the chamfering cutter bodies 31a and 31b placed above and below and having circumferential surfaces shaped like gears. The above-mentioned deburring cutter 32 is composed of a pair of the deburring cutter bodies 32a and 32b placed above and below which are disk-shaped and have blades formed in their circumferential surfaces. The diameter L1 of the chamfering cutter 31 is formed to be greater than the diameter L2 of the deburring cutter 32.

The chamfering cutter 31 and the deburring cutter 32 are disposed on the cutter swing block 35 so that by axially feeding the cutter longitudinal feed block 42 with respect to the workpiece W, the gear-cut workpiece W can be chamfered by the chamfering cutter 31, and burrs of the workpiece W can be removed by the deburring cutter 32.

Concretely, the cutting change amount of the chamfering cutter relative to the workpiece W is computed based on the cutting position of the chamfering cutter 31 when the workpiece W is of the largest shape (maximum diameter) of the workpiece to be processed, and the cutting position of the chamfering cutter 31 when the workpiece W is of the smallest shape (minimum diameter) of the workpiece to be processed. Here, the cutting position of the chamfering cutter 31 refers to the position at which the blade of the chamfering cutter 31 contacts the gear of the workpiece W and this gear is chamfered by the chamfering cutter 31. Furthermore, the cutting change amount of the deburring cutter relative to the workpiece W is computed based on the cutting position of the deburring cutter 32 when the workpiece W is of the largest shape (maximum diameter) of the workpiece to be processed, and the cutting position of the deburring cutter when the workpiece W is of the smallest shape (minimum diameter) of the workpiece to be processed. Here, the cutting position of the deburring cutter 32 refers to the position at which the blade of the deburring cutter 32 contacts the edge of the workpiece W and this gear is deburred by the deburring cutter 32. The chamfering cutter 31 and the deburring cutter 32 are disposed on the cutter swing block 35 so that the cutting change amount of the chamfering cutter and the cutting change amount of the deburring cutter will be nearly equal to each other. The largest shape and the smallest shape of the workpiece to be processed are determined by the specifications of the chamfering cutter 31 and the specifications of the deburring cutter 32. The workpiece to be processed is a workpiece which can be processed by the chamfering cutter 31 and the deburring cutter.

By so disposing the cutters 31, 32, the feed amount of the chamfering cutter 31 and the feed amount of the deburring cutter 32 with respect to the workpiece are rendered nearly equal over the diameter range of the workpiece processable by the chamfering cutter 31 and the deburring cutter 32, from the maximum diameter to the minimum diameter. As a result, the chamfering cutter 31 and the deburring cutter 32 can be positioned by the single cutter longitudinal feed block 42. Thus, the position adjustment of the respective cutters 31, 32 with respect to the workpiece W can be made by a simple structure. Moreover, the device can be downsized.

Figure 6A:
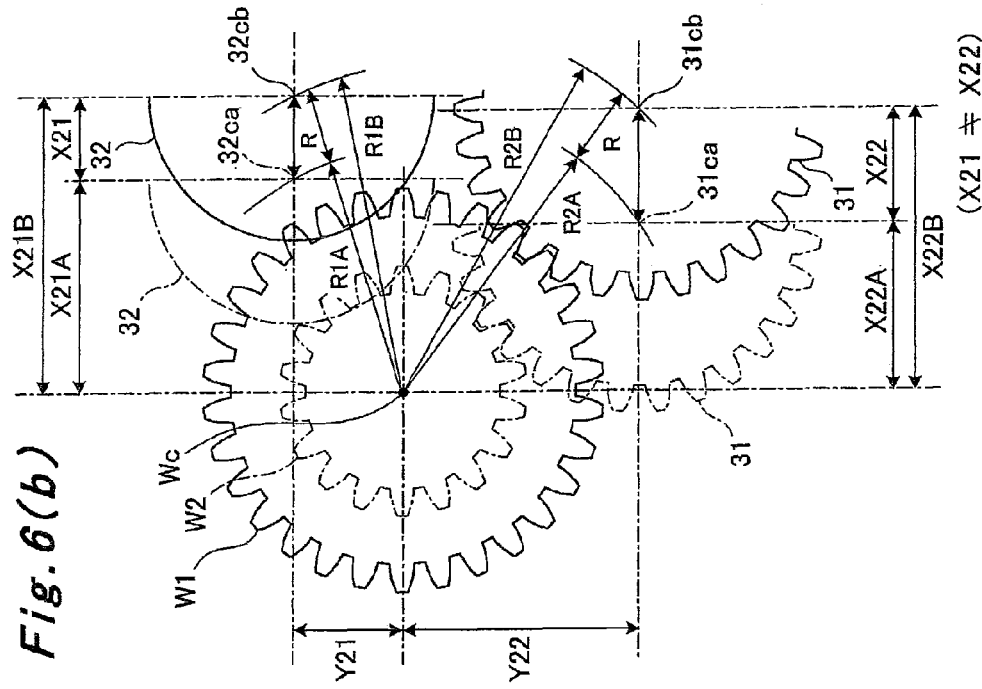
FIGS. 6(a) and 6(b) are views for illustrating the positional relationship between the chamfering cutter/the deburring cutter and the workpiece when the chamfering cutter and the deburring cutter are disposed under poor conditions, FIG. 6(a) showing a case where the workpiece is too close to the chamfering cutter, and FIG. 6(b) showing a case where the workpiece is too close to the deburring cutter.
Figure 6B:
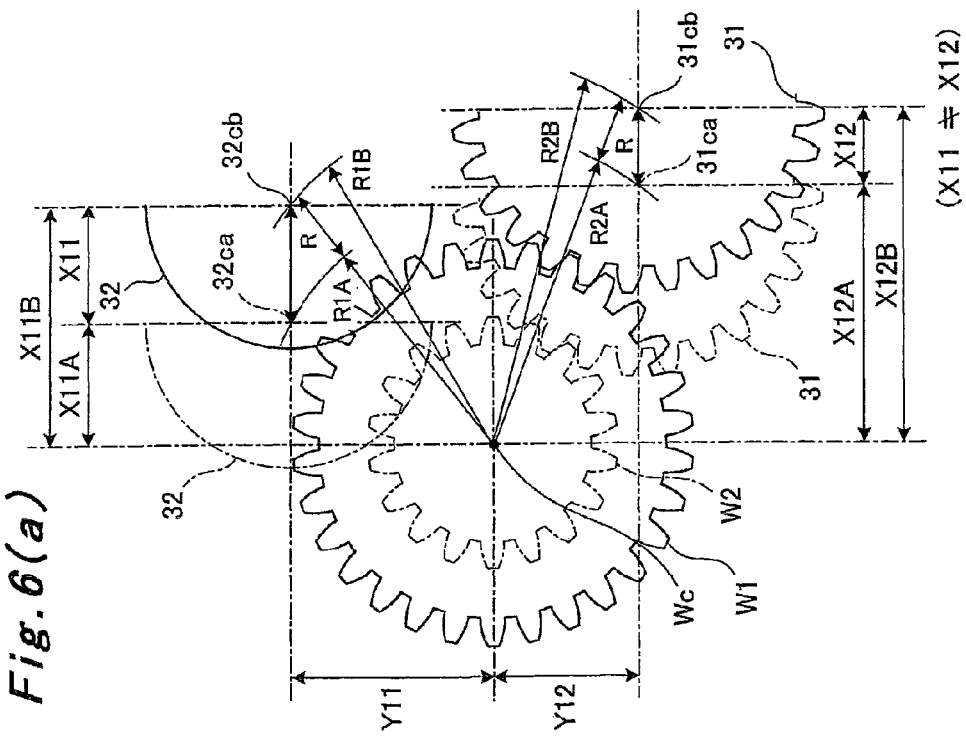

The relation between the size of the workpiece and the moving amount of the chamfering cutter/the moving amount of the deburring cutter will be described concretely by reference to FIG. 5 and FIGS. 6(a), 6(b). FIGS. 6(a), 6(b) indicate the largest shape (maximum diameter) of the workpiece to be processed, by solid lines, and indicate the smallest shape (minimum diameter) of the workpiece to be processed, by dashed dotted lines.

When the workpiece is of the largest shape of the workpiece to be processed, a workpiece W1, the chamfering cutter 31, and the deburring cutter 32 are disposed, as shown by the solid lines in FIG. 5. A distance R1B in the cutting direction between the axis Wc of the workpiece W1 and the axis 32cb of the deburring cutter 32, and a distance R2B in the cutting direction between the axis Wc of the workpiece W1 and the axis 31cb of the chamfering cutter 31 are found by computations.

When the workpiece is of the smallest shape of the workpiece to be processed, a workpiece W2, the chamfering cutter 31, and the deburring cutter 32 are disposed, as shown by the dashed dotted lines in FIG. 5. A distance R1A in the cutting direction between the axis Wc of the workpiece W2 and the axis 32ca of the deburring cutter 32, and a distance R2A in the cutting direction between the axis Wc of the workpiece W2 and the axis 31ca of the chamfering cutter 31 are found by computations.

A distance Y1 between the axis Wc of the workpieces W1, W2 and the axes 32ca, 32cb of the deburring cutter 32 in a direction orthogonal to the feeding direction of the cutter longitudinal feed block 42, and a distance Y2 between the axis Wc of the workpieces W1, W2 and the axes 31ca, 31cb of the chamfering cutter 31 in the same direction are obtained by computations in such a manner as to satisfy Equation (1) indicated below.

[Equation 2]

$$\sqrt{R1B^2 - Y1^2} - \sqrt{R1A^2 - Y1^2} = \sqrt{R2B^2 - Y2^2} - \sqrt{R2A^2 - Y2^2} \quad (1)$$

By disposing the workpiece, the chamfering cutter, and the deburring cutter in the above-mentioned manner, X1 can be equated to X2 (X1=X2). Even when the chamfering cutter and the deburring cutter are mounted on the single feed block, therefore, the workpiece to be processed, whether it is of the largest shape or the smallest shape, can be provided with an appropriate cut.

The chamfering cutter 31 and the deburring cutter 32 are positioned as described above, whereby the feed amount of the chamfering cutter 31 and the feed amount of the deburring cutter 32 with respect to the workpiece W are rendered the same over the diameter range of the workpiece to be processable by the chamfering cutter 31 and the deburring cutter 32, the range extending from the maximum diameter to the minimum diameter.

On the other hand, if the workpiece, the chamfering cutter, and the deburring cutter are not disposed at the positions defined by Y1, Y2 determined by the above-mentioned Equation (1), the relationship X1=X2 shown in FIG. 5 is destroyed. This state is shown in FIGS. 6(a), 6(b).

FIG. 6(a) shows a case where the workpiece is disposed at a position closer to the chamfering cutter. For the smallest shape and the largest shape of the workpiece to be processed, distances R1A, R1B, R2A, R2B in the cutting direction of the deburring cutter and the chamfering cutter are set, and the workpiece, the deburring cutter, and the chamfering cutter are disposed at positions corresponding to Y11, Y12 which are different from Y1, Y2. In this case, Equation (1) is not satisfied, and X11>X12 as seen from the drawing.

FIG. 6(b) shows a case where the workpiece is disposed at a position closer to the deburring cutter. For the smallest shape and the largest shape of the workpiece to be processed, distances R1A, R1B, R2A, R2B in the cutting direction of the deburring cutter and the chamfering cutter are set, and the workpiece, the deburring cutter, and the chamfering cutter are disposed at positions corresponding to Y21, Y22 which are different from Y1, Y2. In this case, Equation (1) is not satisfied, and X21<X22 as seen from the drawing.

Thus, the workpiece, the chamfering cutter, and the deburring cutter are disposed so as to satisfy the aforementioned Equation (1). By so doing, the feed amount of the chamfering cutter 31 and the feed amount of the deburring cutter 32 with respect to the workpiece W can be rendered nearly the same over the diameter range of the workpiece to be processed, the range extending from the maximum diameter to the minimum diameter. Consequently, the chamfering cutter 31 and the deburring cutter 32 can be positioned by the single cutter longitudinal feed block 42. Thus, the position adjustment of the respective cutters with respect to the workpiece can be made by a simple structure. Moreover, the device can be downsized.

A chamfering operation for the gear-cut workpiece W by the aforementioned chamfering device 30 will be described in detail using FIGS. 7(a) to 7(e).

Figure 7A:
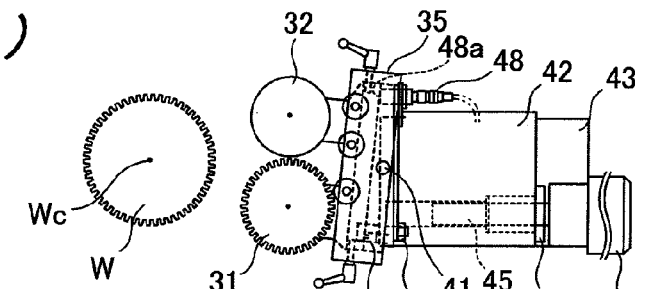

Before chamfering is started, the chamfering cutter 31 and the deburring cutter 32 are located at positions spaced from the gear-cut workpiece W, as shown in FIG. 7(a).

Figure 7B:
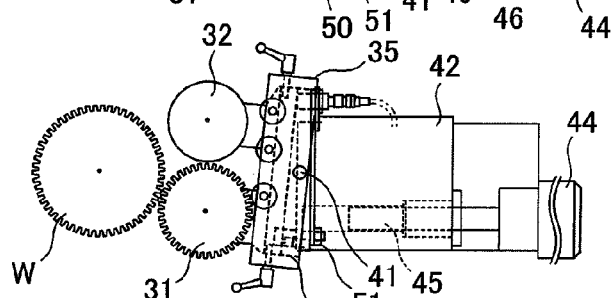

Then, as shown in FIG. 7(b), the cutter longitudinal feed motor 44 is driven to rotate the shaft body 45, thereby moving (advancing) the cutter longitudinal feed block 42 toward the workpiece W up to a position at which the gear of the workpiece W and the blade of the chamfering cutter 31 do not interfere with each other.

Figure 7C:
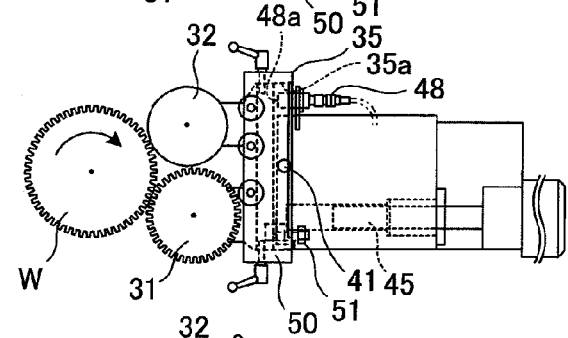

Then, as shown in FIG. 7(c) the workpiece W is rotated, and the cutter longitudinal feed block 42 is positioned at an engagement confirming position. Concretely, the cutter longitudinal feed block 42 is moved toward the workpiece W. When engagement between the tooth of the workpiece W and the tooth of the chamfering cutter 31 is incomplete (the crests of the teeth touch each other), the cutter swing block 35 is swung about the aforementioned swing shaft 41 as a swing center to push the chamfering cutter 31 back. At this time, the leading end 48a of the engagement confirming detector 48 does not contact the inner surface of the hole 35a of the cutter swing block 35, so that the engagement confirming detector 48 is in the OFF state. The pushing-back force is reduced by the swing force exerting spring 50 to a degree to which the workpiece W is not scarred. That is, impact at the time of contact between the workpiece W and the chamfering cutter 31 is reduced by the swing force exerting spring 50. The swing stopper 51 is disposed at an inoperative position, and the force of the shaft body 45 does not act.

Figure 7D:
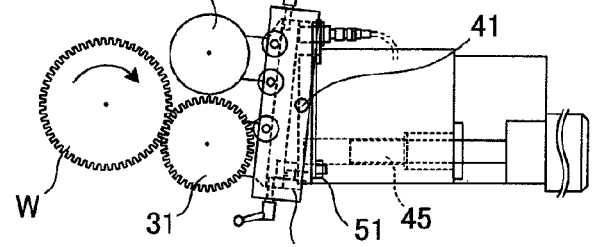

Then, as shown in FIG. 7(d), the cutter swing block 35 is swung by the swing force exerting spring 50 about the swing shaft 41 as the swing center to complete the engagement of the workpiece W with the chamfering cutter 31. At this time, the leading end 48a of the engagement confirming detector 48 contacts the hole 35a of the cutter swing block 35 to bring the engagement confirming detector 48 into the ON state (the engagement is complete).

Figure 7E:
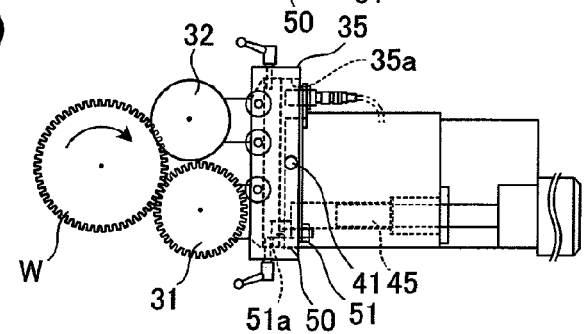

Then, as shown in FIG. 7(e), the cutter longitudinal feed block 42 is advanced toward the workpiece W, and disposed in place. By so doing, the chamfering cutter 31 is disposed at the edge of the workpiece W. At this time, the swing of the cutter swing block 35 is restrained by the swing stopper 51, and the processing force of the chamfering is exerted on the cutter longitudinal feed motor 44 via the swing stopper 51, the cutter longitudinal feed block 42, the cylindrical member 46, and the shaft body 45. Then, the deburring cutter 32 is pressed against the workpiece W (the deburring cutter body 32a is pressed downward, while the deburring cutter body 32b is pressed upward) to remove the burrs formed during the chamfering operation.

Thus, the above-described operation allows the chamfering cutter 31 and the deburring cutter 32 to act simultaneously on the workpiece W, thereby performing the chamfering of the gear of the workpiece W and the deburring of the edges of the workpiece W at the same time. Concretely, the spur tooth of the chamfering cutter 31 is pressed against the upper and lower edges $W_T$ and $W_L$ of the helical gear of the workpiece W (see thick-line parts of the workpiece W in FIG. 3) to deform them plastically, thereby chamfering these parts. On this occasion, burrs occur on the upper side and the lower side of the workpiece W. These burrs are cut and removed by the teeth of the deburring cutter 32. The chamfering cutter 31 and the deburring cutter 32 are disposed on the same cutter swing block 35. Hence, there is no need to position the chamfering cutter 31 and the deburring cutter 32 individually, thus facilitating the operation. Moreover, the structure itself is so simple that an increase in the equipment cost can be curtailed.

The above-mentioned chamfering device 30, therefore, is equipped with the chamfering cutter 31; the deburring cutter 32 having the diameter L2 different from the diameter L1 of the chamfering cutter 31; and the cutter swing block 35 and the cutter longitudinal feed block 42 which rotatably support the chamfering cutter 31 and the deburring cutter 32 and which can adjust the positions of the chamfering cutter 31 and the deburring cutter 32 with respect to the workpiece W. The chamfering cutter 31 and the deburring cutter 32 are disposed such that the cutter swing block 35 and the cutter longitudinal feed block 42 can be axially fed with respect to the workpiece W. The chamfering cutter 31 and the deburring cutter 32 are also arranged so as to satisfy the aforementioned Equation (1), whereby the feed amount of the chamfering cutter 31 and the feed amount of the deburring cutter 32 with respect to the workpiece can be nearly equated to each other over the diameter range of the workpiece to be processed, from the maximum diameter to the minimum diameter. As a result, the chamfering cutter 31 and the deburring cutter 32 can be positioned by the single feed block. Thus, the position adjustment of each cutter with respect to the workpiece can be easily carried out by a simple structure. Also, the device can be downsized. Moreover, the above-mentioned axial feed mechanism is disposed to be axially feedable toward the chamfering cutter 31. Thus, when the cutter swing block 35 is moved toward the workpiece W, the chamfering cutter 31 can be reliably brought into contact with the workpiece W earlier than the deburring cutter 32.

According to the above-described gear cutting machine 100, the gear-cut workpiece W can be subjected to chamfering and deburring, if necessary, within the same device.

According to the specifications of the chamfering cutter 31, the axis-to-axis distance for the chamfering cutter 31 needs to be set at a value different slightly from that for the deburring cutter 32, but the axis-to-axis distance of such a value can be set by the adjustment of the swing stopper 51. Even for a shrinkage in the outer shape of the deburring cutter 32 due to sharpening of the deburring cutter, the adjustment of the swing stopper 51 can similarly accommodate the shrinkage.

In the foregoing descriptions, the present invention has been explained using the gear cutting machine 100 equipped with the chamfering device 30, but may be equipment composed of the chamfering device alone. Even such a device exhibits the same actions and effects as those of the aforementioned chamfering device 30, and it suffices to introduce only the above chamfering device into the gear cutting machine in current use. Thus, an increase in the equipment cost can be suppressed.

In the above descriptions, the hobbing machine is used as the gear cutting machine 100, but the present invention may be equipment having a chamfering device installed in a gear cutting machine other than a hobbing machine. Even such equipment exhibits the same actions and effects as those of the aforementioned gear cutting machine.

In the above descriptions, use is made of the chamfering device 30 for chamfering and deburring the workpiece W having a helical gear cut therein. However, the chamfering cutter is changed in tooth profile, thereby making it possible to perform chamfering and deburring of a workpiece having a spur gear cut therein.

In the above descriptions, use is made of the chamfering device 30 equipped with the pair of chamfering cutter bodies, 31a and 31b, and the pair of deburring cutter bodies, 32a and 32b. However, there may be used a chamfering device in which the chamfering cutter body and the deburring cutter body are disposed only on the upper side or the lower side of the workpiece. With such a chamfering device, after one side of the workpiece is chamfered and deburred, the workpiece is disposed, with its front and back being reversed, whereupon the other side of the workpiece can be chamfered and deburred. Hence, even such a chamfering device exhibits the same actions and effects as those of the aforementioned chamfering device 30.

In the above descriptions, there is used the chamfering device 30 equipped with the chamfering cutter 31 and the deburring cutter 32 having the diameter L2 smaller than the diameter L1 of the chamfering cutter 31. However, it is also possible to apply the present invention to a chamfering device equipped with a chamfering cutter, and a deburring cutter having a diameter larger than the diameter of the chamfering cutter.

INDUSTRIAL APPLICABILITY

The present invention, in a simple configuration, can easily perform the position adjustment of the chamfering cutter and the deburring cutter with respect to the workpiece. Thus, the present invention can be utilized advantageously in the machine tool industry and so on.

EXPLANATIONS OF LETTERS OR NUMERALS

1 Bed
10 Counter column
11 Swing ring
12 Gripper
13 Work arbor
14 Work arbor support
15 Moving mechanism
16 Drive device
20 Column
21 Hob
30 Chamfering device
31 Chamfering cutter
32 Deburring cutter
33, 34 Support block
35 Cutter swing block
41 Swing shaft
42 Cutter longitudinal feed block
44 Cutter longitudinal feed motor
45 Shaft body
48 Engagement confirming detector
50 Swing force exerting spring
51 Swing stopper
100 Gear cutting machine

The invention claimed is:

1. A chamfering device, comprising:
a chamfering cutter for chamfering a workpiece having a gear cut therein;
a deburring cutter for removing burrs of the workpiece, the deburring cutter having an outside diameter different from an outside diameter of the chamfering cutter; and
a feed block which rotatably supports the chamfering cutter and the deburring cutter and can adjust positions of the chamfering cutter and the deburring cutter depending on the diameter of the workpiece,
wherein the chamfering cutter and the deburring cutter are capable of chamfering and deburring, respectively, workpieces within a range of diameters from a minimum possible diameter able to be chamfered and deburred, respectively, by the chamfering cutter and deburring cutter, to a maximum possible diameter able to be chamfered and deburred, respectively, by the chamfering cutter and the deburring cutter,
wherein the chamfering cutter and the deburring cutter are disposed such that the feed block can be fed along an axis toward a rotation axis of the workpiece being chamfered and deburred such that a movement amount of the chamfering cutter in the axial feed direction between a chamfering position of the chamfering cutter at which the chamfering cutter chamfers a workpiece of the maximum possible diameter and a chamfering position of the chamfering cutter at which the chamfering cutter chamfers a workpiece of the minimum possible diameter is equal to a movement amount of the deburring cutter in the axial feed direction between a deburring position of the deburring cutter at which the deburring cutter deburrs the workpiece of maximum possible diameter and a deburring position of the deburring cutter at which the deburring cutter deburrs the workpiece of the minimum possible diameter,
wherein
the deburring cutter and the chamfering cutter are positioned with respect to the workpiece being chamfered and deburred such that
a distance R1B in a direction orthogonal to and between the rotation axis of the workpiece of the maximum possible diameter and a rotation axis of the deburring cutter when the deburring cutter is deburring the workpiece of the maximum possible diameter, and a distance R2B in a direction orthogonal to and between the rotation axis of the workpiece of the maximum possible diameter and a rotation axis of the chamfering cutter when the chamfering cutter is chamfering the workpiece of the maximum possible diameter,
a distance R1A in the direction orthogonal to and between the rotation axis of the workpiece of the minimum possible diameter and a rotation axis of the deburring cutter when the deburring cutter is deburring the workpiece of the minimum possible diameter, and a distance R2A in the direction orthogonal to and between the rotation axis of the workpiece of the minimum possible diameter and a rotation axis of the chamfering cutter when the chamfering cutter is chamfering the workpiece of the minimum possible diameter, and
a distance Y1, which is the distance between the rotation axis of the workpiece of the minimum possible diameter and the rotation axis of the deburring cutter in a direction orthogonal to the axial feed direction of the feed block when the deburring cutter is deburring the workpiece of the minimum possible diameter, and which distance Y1 is also the distance between the rotation axis of the workpiece of the maximum possible diameter and the rotation axis of the deburring cutter in a direction orthogonal to the axial feed direction of the feed block when the deburring cutter is deburring the workpiece of the maximum possible diameter, and a distance Y2, which is the distance between the rotation axis of the workpiece of the minimum possible diameter and the rotation axis of the chamfering cutter in a direction orthogonal to the axial feed direction of the feed block when the chamfering cutter is chamfering the workpiece of the minimum possible diameter, which distance Y2 is also the distance between the rotation axis of the workpiece of the maximum possible diameter and the rotation axis of the chamfering cutter in a direction orthogonal to the axial feed direction of the feed block when the chamfering cutter is chamfering the workpiece of the maximum possible diameter, satisfy the following Equation $$\sqrt{R1B^2-Y1^2}-\sqrt{R1A^2-Y1^2}=\sqrt{R2B^2-Y2^2}-\sqrt{R2A^2-Y2^2}.$$

2. The chamfering device according to claim 1, wherein the feed block constitutes a first feed block;
the chamfering device further comprising:
a second feed block;
an axial feed mechanism capable of axially feeding one of the feed blocks toward the workpiece along the axial feed direction; and
a shaft disposed to be capable of supporting the first feed block on the second feed block.

3. The chamfering device according to claim 2, further comprising restraint means for restraining swing of the first feed block about the shaft.

4. The chamfering device according to claim 3, further comprising an elastic body disposed between the first feed block and the second feed block.

5. The chamfering device according to claim 4, wherein the elastic body is disposed to urge the first feed block toward the chamfering cutter.

6. The chamfering device according to claim 2, further comprising an elastic body disposed between the first feed block and the second feed block.

7. The chamfering device according to claim 6, wherein the elastic body is disposed to urge the first feed block toward the chamfering cutter.

8. A gear cutting machine equipped with the chamfering device according to claim 1.

* * * * *